United States Patent
White et al.

[15] 3,694,083
[45] Sept. 26, 1972

[54] METHOD AND APPARATUS FOR EXPOSING A PORTION OF A PHOTOGRAPHIC STRIP

[72] Inventors: Neil S. White; David E. Wenschhof; Richard R. Mosman, all of 1669 Lake Ave., Rochester, N.Y. 14615

[22] Filed: April 26, 1971

[21] Appl. No.: 137,425

[52] U.S. Cl. .................... 355/133, 355/91, 355/97, 226/97
[51] Int. Cl. .................................................. G03b
[58] Field of Search....355/133, 91, 97, 99, 103, 104, 355/108; 226/7, 197, 97

[56] References Cited

UNITED STATES PATENTS

| 3,488,121 | 1/1970 | Dassonville............226/97 X |
| 2,574,460 | 4/1971 | Snaper......................355/91 |
| 3,398,870 | 8/1968 | Mullan et al...........226/197 X |

FOREIGN PATENTS OR APPLICATIONS

| 705,144 | 3/1965 | Canada.....................355/133 |
| 945,309 | 12/1963 | Great Britain.................226/7 |

*Primary Examiner*—Samuel S. Matthews
*Assistant Examiner*—Richard L. Moses
*Attorney*—W. T. French, R. F. Crocker and Norman Rushefsky

[57] ABSTRACT

A method and apparatus are disclosed for controlling the exposure of a portion of a photographic film strip so that sharp lines of demarcation are formed between exposed and nonexposed areas of the strip. During exposure of a portion of the film strip, the film strip is forced to cooperate with the periphery of an exposure aperture to form a light-seal that substantially prevents light from leaking to areas of the strip adjacent to the portion being exposed. Air jets positioned at the periphery of the aperture are used to create a pressure differential across the strip which tends to draw the strip towards the periphery of the aperture to form the light-seal and also guide the web in a precise path over the aperture.

8 Claims, 3 Drawing Figures

PATENTED SEP 26 1972 3,694,083

NEIL S. WHITE
DAVID E. WENSCHHOF
RICHARD R. MOSMAN
INVENTORS

BY Norman Rudnofsky

ATTORNEY

METHOD AND APPARATUS FOR EXPOSING A PORTION OF A PHOTOGRAPHIC STRIP

BACKGROUND OF THE INVENTION

1. Field of the Invention

This invention relates to an apparatus and method for handling photographic film. More particularly, the invention provides an apparatus and method for exposing portions of photographic film strips so as to form sharp lines of demarcation between exposed areas and adjacent nonexposed areas 2. Description Relative to the Prior Art In the processing of photographic movie film, it has been the practice of photographic film processors to attach a leader strip to an end of each processed movie film to facilitate threading of the film into a movie projector. The addition of a separate leader strip to movie film manufactured with cellulose acetate base is desirable because of the tendency of such film to curl at the ends. However, a separate strip is not necessary with other, more flexible film bases. For example, a film base of polyethylene terephthalate does not require the addition of a separate leader strip but may, instead, have an integral leader strip, i.e., an end portion of the film itself may serve as a leader strip. Movie film with an integral leader strip may be conveniently provided by first forming a latent image of the leader during the manufacture of the unexposed film by exposing selected portions of the film prior to or during winding of the film into a roll. After exposure of the roll of film in a movie camera, the latent images formed on it may be developed by suitable processing and the portion of the film which was exposed during its manufacture will appear at an end of the processed film as an integral leader strip.

In manufacturing film with an exposed leader portion, it is highly desirable to have a sharp line of demarcation between this portion and the unexposed remainder of the film strip. By providing such a sharp line of demarcation, it is possible to form photographic images on frames adjacent to the leader which are properly exposed, rather than being overexposed because of light leadage during the exposing of the leader portion. The problem of light leakage arises in one respect from the leadage of light through a space defined by the film and certain surfaces comprising the periphery of an exposure aperture. Since the light that is used to expose the film is able to leak through this space, areas of the film adjacent to that which is being exposed are vulnerable to being fogged. While the solution to this problem would appear to be to reduce the space between the film strip and the surfaces, such a solution raises the additional problem of having the film strip being scratched or abraded through contact with them. Furthermore, where the film strip and the surfaces are proximately positioned and the strip is continuously moved across the aperture, there is a tendency for the strip to flutter, and fluttering of the strip could increase the probability of contact of the strip with the surfaces, as well as cause the spacing between the film and the surfaces to be varied to the extent that light could leak therebetween.

An additional problem faced in the exposure of a selected portion of a film strip is that suitable provision must be made to prevent light from leaking not only to adjacent film areas, but also to prevent light from leaking out from the exposure apparatus into the room in which unexposed rolls of film are being formed. The above description bears on a typical use of the invention.

SUMMARY OF THE INVENTION

It is therefore an object of the invention to provide a method and apparatus for exposing a selected portion of a photographic film strip without fogging areas of the strip adjacent to the selected portion.

It is another object of the invention to provide an apparatus for selectively exposing portions of a photographic film strip wherein there is substantially prevented the leakage of light from the apparatus.

In accordance with the invention, there is provided a method and apparatus for exposing a portion of a film strip wherein the film strip is supported so that a portion of the strip is above an exposure aperture and wherein air jets positioned at the periphery of the aperture blow against the strip and, anomalously, draw the strip closer to the periphery so that the strip and periphery cooperate to form a light seal.

The invention and its objects and advantages will be more fully understood from the following description when it is read with reference to the accompanying drawings.

DESCRIPTION OF THE PREFERRED EMBODIMENTS

Figure 1:
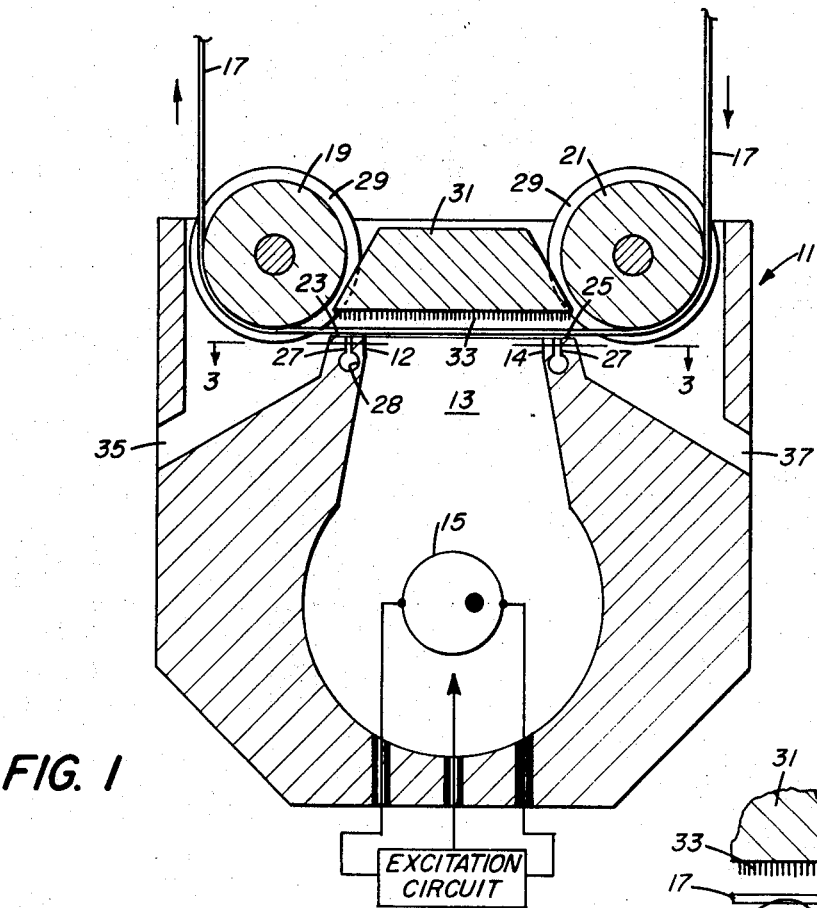
FIG. 1 illustrates a cross-sectional view of a photographic exposure apparatus made in accordance with the invention.

With reference to FIG. 1, an exposure apparatus 11 is shown. The apparatus comprises an exposure aperture 13 having an aperture width defined by the distance between walls 12 and 14. Through aperture 13 light, from a flashlamp 15 or other suitable light source, may be directed to expose a selected portion of a photosensitive film strip 17. The strip 17 is preferably continuously driven and is supported above the aperture 13 by flanged guide rollers 19 and 21. At any time when it is desired to expose a particular portion of the strip 17, the flashlamp may be excited by conventional circuitry so that is flashes once for each unit of aperture width of film feed until the required length of film is exposed. Thus, if the aperture width is about 1 inch and it is desired to expose 10 inches of film strip, the flashlamp 15 may be excited 10 times with each flash occurring after a particular timed interval so that a total of 10 inches of film strip is exposed.

In operation, the film strip 17 will be conveyed past the aperture so that there is a space of about 0.01 inches between the strip and each of the surfaces 23 and 25, which surfaces comprise the periphery of the aperture. Since there is a tendency for light from flashlamp 15 to leak through this space and thereby fog areas adjacent to the exposed portion, the apparatus 11 includes a plurality of narrow air jet passageways 27, terminating at the surfaces 23 and 25 of the aperture 13, and which air jet passageways are adapted to direct high velocity jets of air against the photosensitized surface of the strip 17. The narrow air jet passageways 27 are approximately 0.032 inches in diameter and cooperate with larger passageways 28 which are connected to a suitable source of air under pressure. As noted earlier, the air jets — rather than blowing the strip away form the surfaces 23 and 25 — cause the strip to move against the air jets and be attracted or drawn toward the surfaces 23 and 25, whereby a satisfactory light seal is formed by cooperation of the strip and the surfaces. In addition to decreasing the space between the strip and the surfaces, the air jets cause the web to follow a substantially flutterless path and thereby help to maintain the effectiveness of the light seal. Futhermore, the air jets, by impinging high speed air perpendicularly against the surface of the strip, support the strip 17 and substantially preclude its rubbing against surfaces 23 and 25.

One possible explanation for the movement of the strip against the direction of the air jets is that the air jets produce a high velocity fluid flow parallel to the strip and surfaces 23,25. This fluid flow has a Bernoulli-like effect and creates an area of decreased pressure on the aperture side of the strip. Atmospheric pressure on the opposite side of the strip forces the strip 17 to move closer to the surfaces 23,25, and the strip thereby forms with the surfaces a highly satisfactory light seal.

Figure 2:
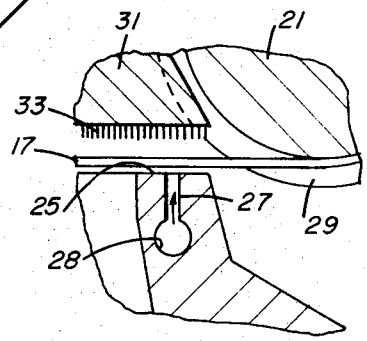
FIG. 2 shows a portion of the cross-sectional view of FIG. 1.
Figure 3:
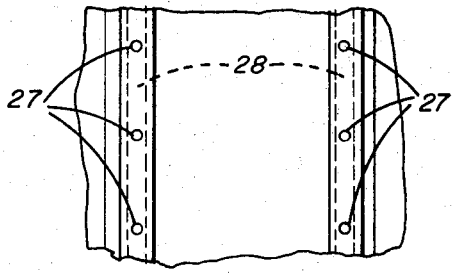
FIG. 3 illustrates a cross-sectional view taken on line 3—3 of FIG. 1.

While the Bernoulli effect, per se, had been previously recognized in the art of handling webs, see, for example, U.S. Pat. No. 3,498,515, it has in this art generally been considered a pariah rather than a useful tool. The reason for this, as brought out in the above patent, is that a pressure drop between an apparatus and a web conveyed over the apparatus causes the web to be pulled into contact with the solid parts of the apparatus. The resulting contact produces scratches on the web and is obviously unsatisfactory. This problem is overcome in the embodiment illustrated in FIGS. 1 through 3 by supporting the strip 17 in tension, such as between guide rollers 19 and 21 which assist in limiting the movement of the strip toward contact with surfaces 23 and 25. Furthermore, as stated above, the air jets emanate from surfaces 23 and 25 — the surfaces most likely to be contacted by the strip — and thereby provide a sufficient air cushion to support the strip out of contact with these surfaces.

In addition to providing a light seal between the strip and surfaces 23 and 25, additional light-sealing may be achieved by providing a light-trapping member 31 between guide rollers 19, 21. Light-trapping member 31 comprises a solid structure having the cross-section shown in FIG. 1 and further includes a rectangular base that is covered with black velveteen 33, a commonly available light-absorbing material. Since the light-absorbing material totally covers the aperture, any light which escapes past the sides of the strip or through the perforations formed therein will be trapped by the material.

Further light-sealing is achieved by having the base of the member 31 fit closely between, i.e., be sandwiched by, the flanges (29) of each roller 19,21. It will be appreciated, therefore, that cooperation of the flanged guide rollers and light-trapping member 31 provides a substantial light-lock so as to preclude light from escaping from the apparatus.

The apparatus 11 further includes air passageways 35 and 37 which cooperate with the air jets to permit air from the jets to exhaust to the atmosphere. And as a by-product of such exhausting, an air current is established which helps prevent dust from accumulating in the apparatus. Further provision may be made to prevent dust from settling on the flashlamp by placing a small fan within the flashlamp housing 22.

The invention has been described in detail with particular reference to preferred embodiments thereof, but it will be understood that variations and modifications can be effected within the spirit and scope of the invention. For example, a hood may be provided above the guide rollers 19,21 to trap further light from the flashlamp 15.

What is claimed is:

1. An apparatus for exposing a portion of a strip having a photosensitized surface so as to preclude substantially the exposure of sensitized areas of said strip adjacent to said portion, said apparatus comprising:
   means for defining an exposure aperture;
   means for supporting said strip in tension so that said portion resides to one side of and faces said exposure aperture;
   means located generally to the opposite side of said aperture for providing light to expose said portion through said aperture; and
   means positioned at the periphery of said aperture for directing jets of fluid against the photosensitized surface of said strip at said adjacent areas so as to force said strip to be moved closer to the periphery of the aperture, whereby the light used to expose said portion is substantially blocked from exposing said adjacent areas by the light-seal formed by the strip and the periphery of the aperture.

2. The invention according to claim 1 wherein said supporting means comprises at least two rollers whose respective axes are spaced in the longitudinal direction of the strip.

3. The invention according to claim 2 wherein there is located between said rollers a light-absorbing material, and said strip is locabetween said light-absorbing material and said exposure aperture.

4. The invention according to claim 3 wherein said rollers include a flange at about each end and said light-absorbing material cooperates with said flanges to form a light-seal therebetween.

5. The invention according to claim 1 wherein said means for directing jets of fluid comprises a plurality of narrow passageways formed within said apparatus and which passageways extend to the periphery of the aperture.

6. A method for exposing a portion of a strip having a photosensitized surface so as to preclude substantially the exposure of sensitized areas of said strip adjacent to said portion, said method comprising the steps of:
   supporting said strip in tension so that said portion resides to one side of and faces an exposure aperture;
   exposing said portion to light from a source located to the other side of said aperture; and directing jets of fluid against the photosensitized surface of said strip at said adjacent areas to force said strip to move closer to the periphery of the aperture, whereby the light used to expose said portion is substantially blocked from exposing said adjacent areas by the light-lock formed by the strip and the periphery of the aperture.

7. The invention according to claim 6 wherein said fluid is air.

8. The invention according to claim 6 wherein said strip is continuously moved past said exposure aperture.

* * * * *